United States Patent [19]

Mitsumoto

[11] Patent Number: 4,993,388
[45] Date of Patent: Feb. 19, 1991

[54] SPARK IGNITION TIMING CONTROL SYSTEM FOR INTERNAL COMBUSTION ENGINE ADAPTED TO MIXTURE FUEL OF MORE THAN ONE INDIVIDUAL FUELS HAVING MUTUALLY DIFFERENT COMBUSTION CHARACTERISTICS

[75] Inventor: Hisashi Mitsumoto, Ebina, Japan

[73] Assignee: Nissan Motor Company, Limited, Yokohama, Japan

[21] Appl. No.: 514,036

[22] Filed: Apr. 27, 1990

[30] Foreign Application Priority Data

Apr. 27, 1989 [JP] Japan .................. 1-110879

[51] Int. Cl.⁵ .................. F02P 5/14; F02P 5/15
[52] U.S. Cl. .................. 123/425; 123/435; 364/431.08
[58] Field of Search .............. 123/1 A, 416, 417, 425, 123/435, 494; 73/35, 117.3; 364/431.05, 431.08

[56] References Cited

U.S. PATENT DOCUMENTS

| | | | |
|---|---|---|---|
| 4,450,810 | 5/1984 | Wada et al. | 123/435 X |
| 4,561,401 | 12/1985 | Hata et al. | 123/435 X |
| 4,619,236 | 10/1986 | Okada et al. | 123/435 X |
| 4,679,536 | 7/1987 | Morita | 123/435 X |
| 4,727,841 | 3/1988 | Hirose et al. | 123/435 X |
| 4,905,648 | 3/1990 | Washino et al. | 364/431.08 X |
| 4,905,649 | 3/1990 | Washino et al. | 123/435 |
| 4,920,494 | 4/1990 | Abo et al. | 123/435 X |

FOREIGN PATENT DOCUMENTS

| | | | |
|---|---|---|---|
| 0205463 | 8/1988 | Japan | 123/425 |
| 0267338 | 10/1989 | Japan | 123/425 |

Primary Examiner—Willis R. Wolfe
Attorney, Agent, or Firm—Foley, & Lardner, Schwartz, Jeffery, Schwaab, Mack, Blumenthal & Evans

[57] ABSTRACT

In order to accomplish aforementioned and other objects, a spark ignition timing control system, according to the present invention, is adapted to perform spark ignition timing control for an internal combustion engine combustioning a blended fuel, such as gasoline/alcohol mixture fuel. The control system performs MBT control by adjusting spark advance angle toward a maximum pressure point in feedback manner. The spark advance angle derived in MBT control is modified with a correction value derived on the combustion propagation speed which is variable depending upon blending ratio of one of the fuels in the blended fuel.

14 Claims, 4 Drawing Sheets

SPARK IGNITION TIMING CONTROL SYSTEM FOR INTERNAL COMBUSTION ENGINE ADAPTED TO MIXTURE FUEL OF MORE THAN ONE INDIVIDUAL FUELS HAVING MUTUALLY DIFFERENT COMBUSTION CHARACTERISTICS

BACKGROUND OF THE INVENTION

1. Field of the Invention

The present invention relates generally to a spark ignition timing control system for an automotive internal combustion engine for adjusting spark advance magnitude for optimal engine performance. More specifically, the invention relates to a spark ignition timing control system specifically adapted for controlling spark ignition timing in engine operation combustioning a mixture fuel, in which more than one type fuels, such as gasoline and alcohol, having mutually different combustion characteristics.

2. Background of the Invention

It is recent trend in the automotive technology to seek for higher anti-polution performance for protecting or recover pure atmosphere. Particularly, in the automotive vehicle exhaust gas, significant reduction of polutant, such as $No_x$, CO and so forth, is becoming more and more strong order for this purpose. As can be appreciated, from the past, various attempts have been made for purification of engine exhaust gas. Such attempts gain significant level of improvement in terms of anti-polution. However, in view of increasing of automotive vehicles, further purification of exhaust gas becomes strictly important.

From the past, it has been known in the automotive technologies that alcohol fuel may create much lesser polutant, such as $NO_x$, CO and so forth, in comparison with petrol or qasoline. Since alcohol fuel can be industrially or artificially produced, hi bride fuel engines have already been developed and put into the market in certain countries. Such hi-bride fuel engine utilizes a blended fuel of gasoline and alcohol. In such blended fuel, combustion characteristics of the fuel varies significantly depending upon gasoline/alcohol mixture ratio due to relatively low combustibility of alcohol. Therefore, in case of such blended fuel, fuel delivery amount in terms of an induction air flow rate, spark ignition timing and so forth need to be controlled adapting the blended fuel property.

As is well known, spark ignition timing controls are performed principally for seeking maximum spark advance angle for best torque in view of optimization of engine output performance. Such MBT control is combined with knock control in which spark advance angle is adjusted for maintaining the engine in light-knock condition. For harmonizing both of the MBT control and the knock control, Japanese Patent First (unexamined) Publication (Tokkai) Showa 61-14479 proposes spark ignition timing control for controlling spark advance angle with respect to respective of individual engine cylinders. Namely, in the proposed system, knocking resistance at each individual engine cylinder is experimentally checked. MBT control is then performed in view of a cylinder pressure data in an engine cylinder having the highest knocking resistance until unacceptable engine knocking is detected. When unacceptable engine knocking is detected at the aforementioned specific engine cylinder having the highest knocking resistance, then the engine cylinder having second highest knocking resistant is selected to use the cylinder pressure data thereof for MBT control. Such proposal may be effective for enabling advancing of spark advance in most of the engine cylinders at MBT point.

The aforementioned prior proposal may be only applicable for the spark ignition timing control in terms of homogeneous fuel, i.e. gasoline, engine. In case of blended fuel, the proposed procedure of spark advance control cannot be directly applied due to substantial variation of MBT points depending upon gasoline/alcohol blending ratio. Substantial variation of MBT points may not significantly affect for the spark ignition timing control performance as far as steady or stable engine operating condition is concerned since the spark advance angle can be gradually adjusted toward the MBT point by feedback control. However, on the other hand, in the engine transition state, such as accelerating and decelerating state of the engine, offset of spark advance angle from MBT will cause substantial degradation of spark ignition timing control performance. Namely, when the spark advance angle is set at far retard angle from MBT point, the engine output can be lowered than that can be obtained at MBT point, to cause lowering of engine acceleration performance during engine acceleration state. On the other hand, excess magnitude of spark advance in terms of MBT point will leads unacceptable engine knocking.

In view of such difficulty, Japanese Patent First Publication (Tokkai) Showa 61-85578 proposes setting of variable basic spark advance in terms of property of fuel to be combustioned. For this, a fuel sensor for detecting mixture ratio or concentration of one of individual fuels in the blended fuel to select one of a plurality of settings. In case of gasoline/alcohol blended fuel, since the fuel property changed substantially according to the concentration of alcohol versus gasoline, substantially large capacity of memory becomes necessary for pre-setting various basic spark advance with respect to all possible variation range of alcohol mixture ratio.

SUMMARY OF THE INVENTION

Therefore, it is an object of the present invention to provide a spark ignition timing control system for an internal combustion engine adapted for a fuel composed of more than one fuels having mutually different combustion property, with enhanced control characteristics in engine transition period.

In order to accomplish aforementioned and other objects, a spark ignition timing control system, according to the present invention, is adapted to perform spark ignition timing control for an internal combustion engine combustioning a blended fuel, such as gasoline/alcohol mixture fuel. The control system performs MBT control by adjusting spark advance angle toward a maximum pressure point in feedback manner. The spark advance angle derived in MBT control is modified with a correction value derived on the combustion propagation speed which is variable depending upon blending ratio of one of the fuels in the blended fuel. According to one aspect of the invention, a spark ignition timing control system for an internal combustion engine adapted for combustioning with a fuel composed of more than one mutually different fuels, comprising:

first sensor means for monitoring a preselected basic engine operating parameters to produce a first sensor signal representative of the monitored engine operating condition;

second sensor means for monitoring variation of internal pressure in an engine cylinder to produce a second sensor signal indicative of the monitored internal pressure;

third means for deriving a basic fuel advance angle on the basis of the first sensor signal;

fourth means for detecting lag period between spark ignition and occurrence of the maximum pressure in the engine cylinder to predict concentration of the selected one of the fuels in the blended fuel, fifth means for deriving a first correction value on the basis of the second sensor signal;

sixth means for deriving a second correction value on the basis of the predicted concentration of the selected one of the fuels; and seventh means for correcting the basic fuel advance angle with the first and second correction values for deriving a spark advance angle to control the spark ignition timing.

Preferably, the fourth means compares the spark advance angle at which spark ignition is actually performed and an angle at which maximum pressure in the engine cylinder is detected for deriving an angular deviation therebetween and arithmetically derives the lag time for predicting the concentration of the selected one of fuels. In such case, the sixth means may derive the second correction value on the basis of the predicted concentration of the selected one of fuels and the first sensor signal. The first sensor may monitor the basic engine operating parameter including an engine revolution speed and an engine load, and the sixth means derives a first correction value component on the basis the concentration of the selected one of fuels and the engine revolution speed and a second correction value component on the basis of the concentration of the selected one of the fuels and the engine load. The second correction value may be derived by summing the first and second correction value components.

Furthermore, the spark ignition timing control system further comprise eighth means for detecting an engine cranking state to produce a cranking state indicative signal and the fourth means is active for setting the concentration of the selected one of fuels at an initial value performs first mode of prediction for deriving the concentration of the selected one of fuels under the presence of the cranking state indicative signal, and performs second mode of prediction for deriving the concentration. In such case, the fourth means may be responsive to initiation of cranking to set the concentration of the selected one of fuels at a value corresponding to that of the concentration stored in the last run of the engine and maintains the set concentration until a timing where first spark ignition is performed, and performs the first mode prediction to vary the predicted concentration periodically so that the angular position where the maximum pressure in the engine cylinder is obtained, is maintained within a predetermined angular range. Preferably, the fourth means may switch concentration predicting mode from the first prediction mode to the second prediction mode in response to expiration of a predetermined period after initiation of cranking and after termination of the cranking state indicative signal, and the fourth means derives the predicted concentration of the selected one of fuel on the basis of the lag time in the second prediction mode. The fourth means preferably performs the first prediction mode operation for varying the predicted concentration by a fixed value at every prediction cycle. In such case, the fourth means compares the second signal value with angular criteria defining the predetermined angular range for performing the first mode prediction when the first signal value is output the predetermined angular range.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment but are for explanation and understanding only.

In the drawings.

DESCRIPTION OF THE PREFERRED EMBODIMENT

Figure 1:
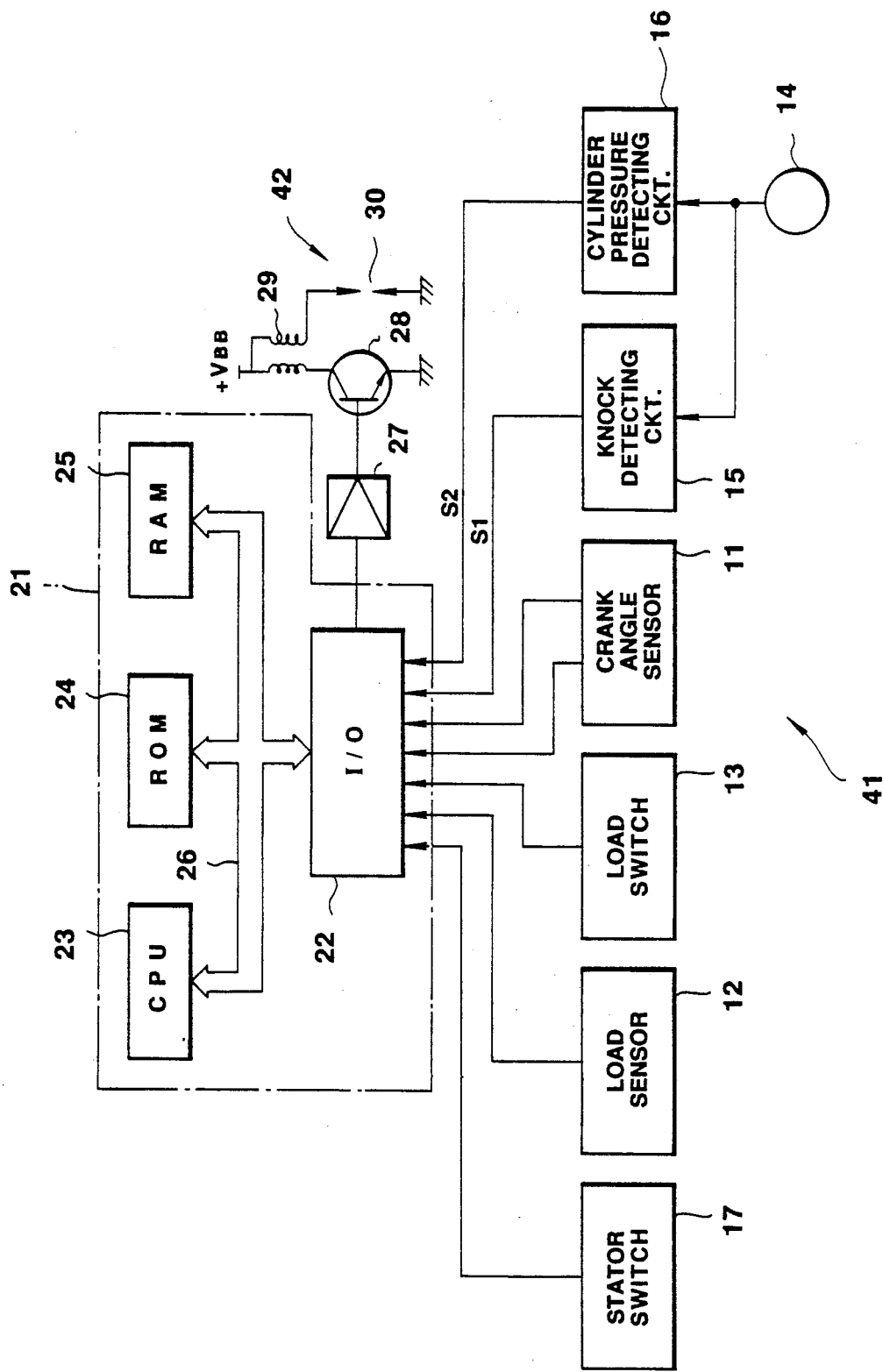
FIG. 1 is a block diagram of the preferred embodiment of a spark ignition timing control system, according to the present invention.

Referring now to the drawings, particularly to FIG. 1, the preferred embodiment of a spark ignition timing control system, according to the present invention, has a control unit 21 comprises a microprocessor including an input/output unit 22, central processing unit (CPU) 23, a random access memory (RAM) 25 and read-only member (ROM) 24. A crank angle sensor 11, an engine load sensor 12, a load switch 13, a pressure sensor 14 and a starter switch 17 are provided for monitoring control parameters and thus feed parameter data to the control unit 21. The crank angle sensor 11 monitors an angular position of a crankshaft for producing a crank reference signal $\theta_{REF}$ at every predetermined angular position of the crankshaft and a crank position signal $\theta_{POS}$ at every predetermined angle of angular displacement of the crankshaft. The engine load sensor 12 typically comprises an intake air flow sensor, such as an air flow meter, for monitoring an intake air flow rate as a data reflecting an engine load condition Qa to provide an engine load indicative data for the control unit 12. The engine load sensor should not be appreciated to be specified to the intake air flow sensor but can be replaced with various sensors monitoring equivalent parameters reflecting the engine load condition, such as a throttle angle sensor, an intake vacuum sensor and so forth. The engine load switch 13 may typically comprises an engine idling switch 13 detecting an idling condition of the engine to produce a binary signal varying signal level between HIGH level and LOW level depending upon the engine load condition. For example, in case of the engine idling switch, it turns ON to provide HIGH level engine idling state indicative signal when engine idling condition, e.g. a throttle valve is fully closed or substantially closed position. The pressure sensor 14 to be employed in the shown embodiment is adapted to monitor a pressure in the interior of the engine combustion chamber to produce a pressure indicative signal. Typically, the pressure sensor 14 comprises a washer type sensor fixed onto an engine cylinder block or cylinder head together with an ignition plug. The pressure sensor 14 is connected to a knock detector circuit 15 and a cylinder pressure detecting circuit 16. The knock detector circuit 15 processes the pressure indicative signal of the pressure sensor 14 to produce an engine knocking data $S_1$ representative of a magnitude of engine knocking occurring in the engine cylinder. On the other hand, the cylinder pressure detecting circuit 16 processes the pressure indicative signal to produce a cylinder pressure data $S_2$ representative of the internal pressure in the engine cylinder. The starter switch 17 is generally composed of an ignition switch and turned ON during engine cranking. Therefore, the HIGH level starter switch signal is employed as engine cranking state indicative signal.

The input/output unit 22 is connected to a power transistor 28 via an output amplifier 27 to provide a trigger signal. The power transistor 28 is thus switched between ON and OFF for controlling supply of electric power to an ignition coil 29 from a power source, i.e. vehicular battery $V_{BB}$ to cause spark ignition in a spark plug 30 at a controlled timing.

As is well known, the spark ignition timing control system performs MBT control for adjusting spark advance angle at an angle where the highest internal pressure in the engine cylinder is obtained and knock control for maintaining the engine knocking magnitude at light knock condition. For this, a basic spark advance angle BASE is derived on the basis of an engine revolution speed N and an engine load reflective data Tp ($=K \times Qa/N$ K:constant). A cylinder pressure dependent correction value is derived on the basis of the cylinder pressure data so as to adjust the spark advance at the angle where the maximum internal pressure $\theta_{pmax}$ is obtained in feedback manner. The correction value derived on the basis of the angular position to obtain the maximum internal pressure $\theta_{pmax}$ will be hereafter referred to as "MBT correction value $\Delta\theta_1$". For detecting the maximum internal pressure $\theta_{pmax}$ in the engine cylinder, the cylinder pressure data is sampled at every 1 degree of angular displacement of the crankshaft in a range of the top-dead-center (TDC) and 50 degree advanced from TDC (ATDC 50°) and thus detects the crankshaft angular position at which the maximum internal pressure is obtained. This process for detecting the maximum pressure point of the crankshaft angular position has been disclosed in Japanese Patent First (unexamined) Publication (Tokkai) Showa 59-39974, for example. The disclosure of this Tokkai Showa 59-39974 is herein incorporated by reference for the sake of disclosure. A spark advance angle ADV derived by correcting the basic spark advance angle BASE by the MBT correction value $\Delta\theta_1$, a knock control correction value $\Delta\theta_2$ and an alcohol concentration dependent correction value $\Delta\theta_3$. In general, the MBT correction value $\Delta\theta 1$ is derived for adjusting the spark advance angle toward the MBT point.

The spark advance angle ADV thus derived in the most recent derivation cycle is set as "current advance angle data STADV". Then, the current advance angle data STADV is compared with the maximum pressure point angle $\theta_{pmax}$ to derive a advance angle deviation data DADV ($=\theta_{pmax}-$STADV). As long as engine combustioning condition is unchanged, the advance angular deviation data DADV represents combustion propagation period within the engine cylinder. Therefore, this period TADV can be derived by:

TADV=(DADV/N)×C where C is constant.

Figure 5:
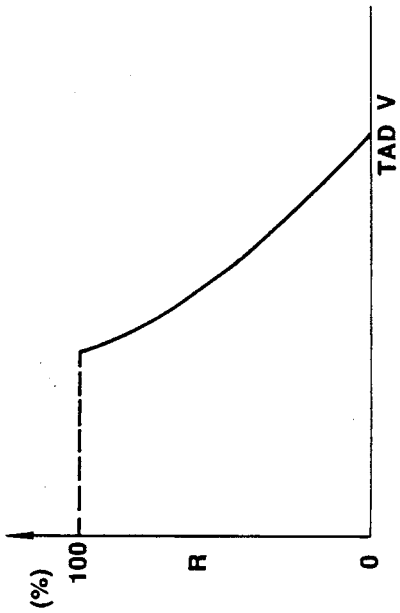
FIG. 5 is a chart showing relationship between combustion propagation time relative to alcohol concentration in a blended fuel.

The period TADV derived as set forth above will be referred to as "combustion propagation period". Relationship between the concentration R of alcohol in the blended fuel versus the combustion propagation period is illustrated in FIG. 5. In other words, the alcohol concentration R in the blended fuel can be predicted on the basis of the combustion propagation period data TADV.

Figure 4:
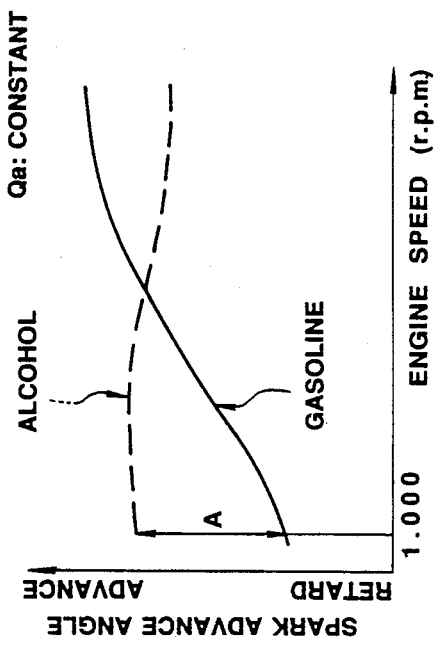
FIG. 4 is a chart showing variation of spark advance angle in relation to an engine revolution speed
Figure 3:
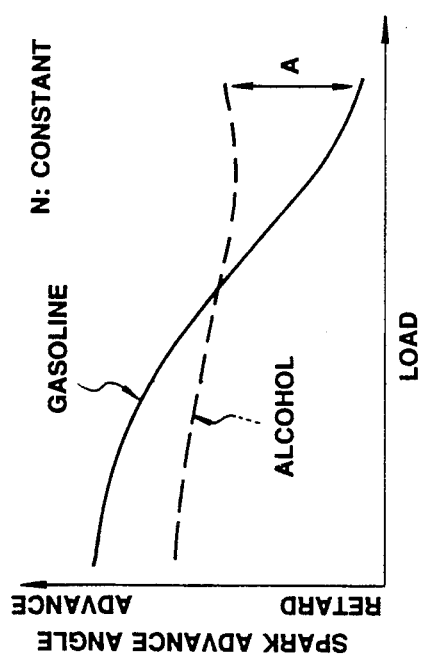
FIG. 3 is a chart showing variation of spark advance angle in relation to an engine load.
Figure 6:
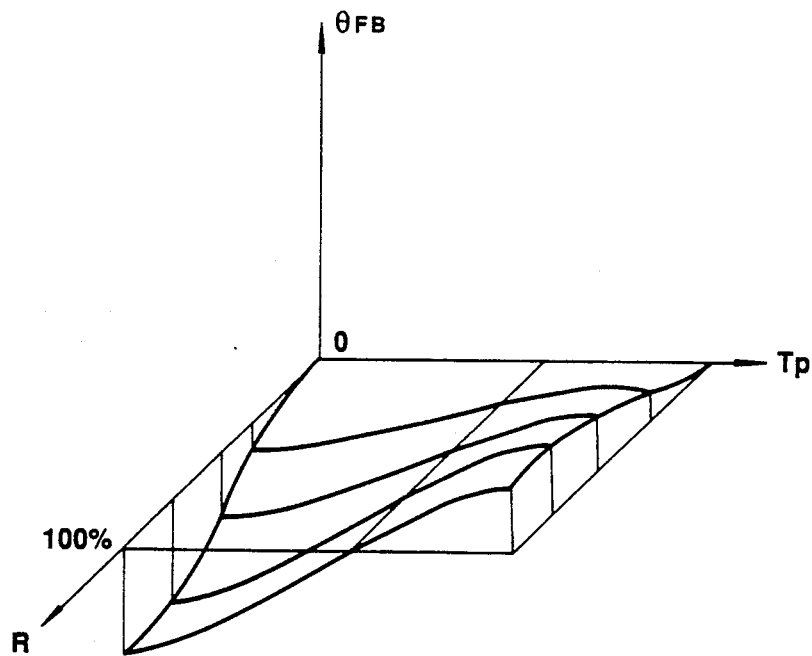
FIGS. 6 and 7 are charts showing three dimensional tables respectively established with respect to an basic engine load reflective value Tp, an alcohol concentration R and a feedback correction value $\Delta\theta_{FB}$, and with respect to an engine speed N, the alcohol concentration R and an alcohol concentration dependent correction value $\Delta\theta_R$.
Figure 7:
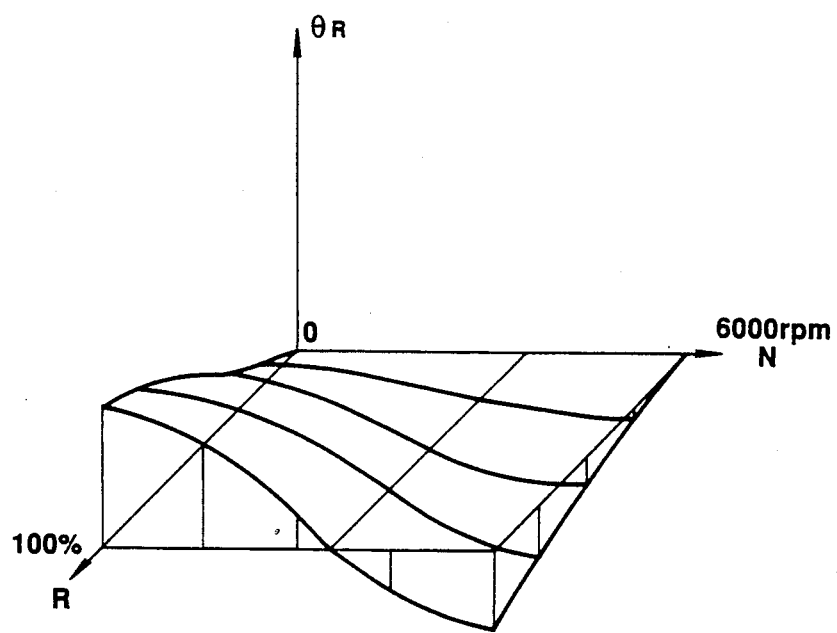

The alcohol concentration R thus predicted identifies the position of the lateral axis on the charts of FIGS. 3 and 4. Therefore, utilizing the chart of FIGS. 3 and 4 which may be set in a form of tables, an engine speed dependent correction value $\Delta\theta_{RN}$ and an engine load dependent correction value $\Delta\theta_{RTp}$ are derived respectively in terms of the engine revolution speed data N and the engine load reflective data Tp. The engine speed dependent data $\Delta\theta_{RN}$ thus derived has variation characteristics as illustrated in FIG. 6. Similarly, the engine load dependent correction value $\Delta\theta_{RTp}$ has variation characteristics as shown in FIG. 7. In FIGS. 6 and 7, the polarity of the correction values $\Delta\theta_{RN}$ and $\Delta\theta_{RTp}$ represents direction of adjustment. Namely, when the correction value is in positive value range requires advancing adjustment of the spark advance angle and the negative correction value range requires retarding adjustment of the spark advance angle. The engine speed dependent correction value $\Delta\theta_{RN}$ and the engine load dependent correction value $\Delta\theta_{RTp}$ are summed to derive a alcohol concentration dependent correction value $\Delta\theta_R$.

On the other hand, knock control to be performed by the preferred embodiment of the spark ignition timing control system, is performed in per se known manner. Namely, a knock control correction value $\Delta\theta_2$ is derived for suppressing heavy knocking and maintain the knocking magnitude at light knock condition. The knock control correction value $\Delta\theta_2$ is summed with the MBT correction value $\Delta\theta_1$ to form a feedback correction value $\Delta\theta_{FB}$.

With this process, since high precision of control can be provided by the feedback correction values $\Delta\theta_{FB}$ for adapting the spark advance angle to the actual engine driving condition, the alcohol concentration dependent correction value $\Delta\theta_R$ is not required high precision. As a result, the table for using in derivation of the alcohol concentration dependent correction value $\theta_R$ can be rough enough to enable establishment of the table without requiring substantially large capacity for the memory.

Figure 2:
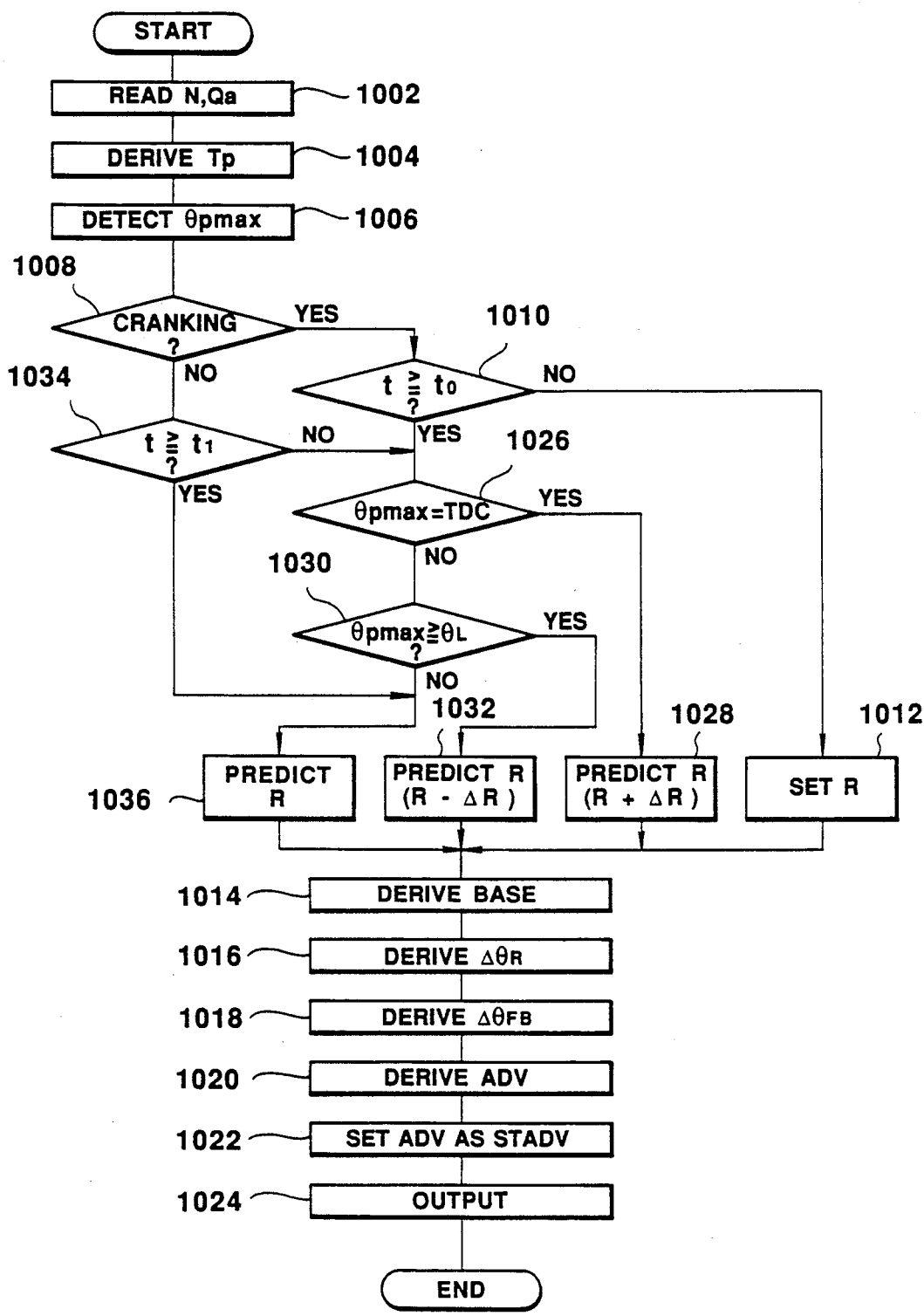
FIG. 2 is a flowchart showing a process of spark ignition timing control performed by the preferred embodiment of the spark ignition timing control system of FIG. 1

The process of spark ignition timing to be executed by the preferred embodiment of the spark ignition timing control system, according to the present invention will be discussed herebelow with reference to FIG. 2. The flowchart illustrated in FIG. 2 shows a routine for controlling spark ignition timing to be executed at every predetermined timing. Immediately after starting execution, the engine speed data N representative of the engine revolution speed is read at a step 1002; the engine load reflective data Tp is read at a step 1004 and the maximum pressure point data $\theta_{pmax}$ is read out at a step 1006. Thereafter, the starter signal level is checked at a step 1008. By checking this, judgement can be made whether the engine is in cranking state or not. If the engine is cranking state and therefore the HIGH level starter switch signal is detected as checked at the step 1008, and elapsed time t is checked against a cranking reference time $t_O$ which is a possible period required for first combustion after initiation of cranking operation, at a step 1010. If the elapsed time t is shorter than the cranking reference time $t_O$, judgement can be made that first combustion is not occuring yet. Until the first combustion occurs, the maximum pressure point $\theta_{pmax}$ is coincident with TDC. Therefore, prediction of the alcohol concentration cannot predicted. At this time, a previously predicted alcohol concentration R is read out and used as temporary alcohol concentration data, at a step 1012. Then, the basic spark advance angle is derived on the basis of the engine speed data N and the engine load reflective data Tp in a known manner at a step 1014. At a step 1016, the alcohol concentration dependent correction value $\Delta\theta_R$ is derived on the basis of the engine speed data N, the engine load reflective data Tp and the alcohol concentration data R read at the step 1012. Then, the feedback correction value $\Delta\theta_{FB}$ is derived on the basis of the maximum pressure point data $\theta_{pmax}$ at a step 1018. Then, the basic spark advance angle BASE is corrected with the alcohol concentration dependent correction value $\Delta\theta_R$ and the feedback correction value $\theta_{FB}$ to derive a spark advance angle ADV, at a step 1020. The spark advance angle ADV is then set as the current advance angle data STADV at a step 1022. The spark advance angle indicative signal indicative of the spark advance angle ADV is output at a step 1024 for controlling spark ignition timing to be actually taken place.

On the other hand, when the elapsed period t as checked at the step 1010 is longer than or equal to the cranking reference time t₀, judgement can be made that the first combustion is already taken place. Then, the maximum pressure point data $\theta_{pmax}$ is compared with TDC to check whether the maximum pressure in the combustion chamber is obtained at TDC, at a step 1026. If the answer at the step 1026 is positive, it can be supposed that misfiring is caused at the first combustion in some reason, such as too lean mixture. Such excessively lean mixture can be formed when alcohol concentration is changed significantly during the period while the engine is held in operative. The substantial change of alcohol concentration may be caused by re-filling alcohol. At this time, because the combustion propagation period TADV becomes substantially short, judgement possible be made that the fuel combustioned is pure alcohol. However, such change is practically not possible to cause at usual case. Therefore, when the answer at the step 1026 is positive, the alcohol concentration data R is updated by adding a predetermined fixed value ΔR, e.g. 20 to 30%, at a step 1028. After updating the alcohol concentration data R at the step 1028, process goes to the step 1014 to perform subsequent steps for outputting the spark advance indicative signal.

On the other hand, when the maximum pressure point $\theta_{pmax}$ is not equal to TDC, then the maximum pressure point $\theta_{pmax}$ is compared with a predetermined advance limit angle $\theta_L$ at a step 1030. Abrupt change of alcohol concentration to cause shifting of the maximum pressure point $\theta_{pmax}$ to the advance limit angle $\theta_L$ can be caused by decreasing of alcohol concentration due to re-filling of gasoline. Decreasing of the alcohol concentration may cause over-rich condition of the air/fuel mixture to cause after firing. Therefore, when the answer at the step 1030 is positive, the alcohol concentration data R is decreased by the fixed value ΔR at a step 1032. After the step 1032, process goes to the step 1014.

On the other hand, when the starter switch signal checked at the step 1008 is LOW level and thus judgement can be made that the engine is not in cranking state, process goes to a step 1034 to compare the elapsed time t from initiation of cranking is longer than a predetermined initial engine driving period criterion $t_1$. If the elapsed time t is shorter than the initial engine driving period criterion $t_1$, process goes to the step 1026. On the other hand, if the elapsed time t is longer than or equal to the initial engine driving period criterion $t_1$ as checked at the step 1034, prediction of the alcohol concentration R on the basis of the current spark advance indicative data STADV and the maximum pressure point $\theta_{pmax}$, at a step 1036. Subsequently, process goes to the step 1014.

As can be appreciated through the process of the series of steps of 1008, 1010, 1012, 1026, 1028, 1030 and 1032, during the engine cranking period, the predicted alcohol concentration R is varied in stepwise fashion in view of the relationship of the maximum pressure point to TDC and to the predetermined advance limit. This enables to adjust the spark advance angle nearly at an optimal angle in view of the alcohol concentration in the blended fuel. Namely, even when the alcohol concentration is substantially varied due to re-filing of blended or pure fuel having alcohol blending ratio different from that used in the previous run, spark ignition timing can be adapted to the alcohol blending ratio in the blended fuel. Therefore, engine starting-up characteristics can be improved for wide range of variation of the alcohol blending ratio in the blended fuel.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A spark ignition timing control system for an internal combustion engine adapted for combustioning with a fuel composed of more than one mutually different fuels, comprising:

first sensor means for monitoring a preselected basic engine operating parameters to produce a first sensor signal representative of the monitored engine operating condition;

second sensor means for monitoring variation of internal pressure in an engine cylinder to produce a second sensor signal indicative of the monitored internal pressure;

third means for deriving a basic fuel advance angle on the basis of said first sensor signal, fourth means for detecting lag period between spark ignition and occurrence of the maximum pressure in said engine cylinder to predict concentration of the selected one of the fuels in said blended fuel;

fifth means for deriving a first correction value on the basis of said second sensor signal;

sixth means for deriving a second correction value on the basis of the predicted concentration of the selected one of the fuels; and seventh means for correcting said basic fuel advance angle with said first and second correction values for deriving a spark advance angle to control the spark ignition timing.

2. A spark ignition timing control system as set forth in claim 1, wherein said fourth means compares the spark advance angle at which spark ignition is actually performed and an angle at which maximum pressure in said engine cylinder is detected for deriving an angular deviation therebetween and arithmetically derives said lag time for predicting the concentration of the selected one of fuels.

3. A spark ignition timing control system as set forth in claim 2, wherein said sixth means derives said second correction value on the basis of said predicted concentration of the selected one of fuels and said first sensor signal.

4. A spark ignition timing control system as set forth in claim 3, wherein said first sensor monitors the basic engine operating parameter including an engine revolution speed and an engine load, and said sixth means derives a first correction value component on the basis said concentration of the selected one of fuels and said engine revolution speed and a second correction value component on the basis of said concentration of the selected one of the fuels and said engine load.

5. A spark ignition timing control system as set forth in claim 4, wherein second correction value is derived by summing said first and second correction value components.

6. A spark ignition timing control system as set forth in claim 1, which further comprises eighth means for detecting an engine cranking state to produce a cranking state indicative signal and said fourth means is active for setting said concentration of the selected one of fuels at an initial value performs first mode of prediction for deriving said concentration of the selected one of fuels under the presence of said cranking state indicative signal, and performs second mode of prediction for deriving said concentration.

7. A spark ignition timing control system as set in claim 1, wherein said fourth means is responsive to initiation of cranking to set the concentration of said selected one of fuels at a value corresponding to that of the concentration stored in the last run of the engine and maintains the set concentration until a timing where first spark ignition is performed, and performs said first mode prediction to vary the predicted concentration periodically so that the angular position where the maximum pressure in the engine cylinder is obtained, is maintained within a predetermined angular range.

8. A spark ignition timing control system as set forth in claim 7, wherein said fourth means switches concentration predicting mode from said first prediction mode to said second prediction mode in response to expiration of a predetermined period after initiation of cranking and after termination of said cranking state indicative signal, and said fourth means derives said predicted concentration of the selected one of fuel on the basis of said lag time in said second prediction mode.

9. A spark ignition timing control system as set forth in claim 8, wherein said fourth means performs said first prediction mode operation for varying said predicted concentration by a fixed value at every prediction cycle.

10. A spark ignition timing control system as set forth in claim 9, wherein said fourth means compares the second signal value with angular criteria defining said predetermined angular range for performing said first mode prediction when said first signal value is output said predetermined angular range.

11. A spark ignition timing control system as set forth in claim 6, wherein said fourth means compares the spark advance angle at which spark ignition is actually performed and an angle at which maximum pressure in said engine cylinder is detected for deriving an angular deviation therebetween and arithmetically derives said lag time for predicting the concentration of the selected one of fuels.

12. A spark ignition timing control system as set forth in claim 11, wherein said sixth means derives said second correction value on the basis of said predicted concentration of the selected one of fuels and said first sensor signal.

13. A spark ignition timing control system as set forth in claim 12, wherein said first sensor monitors the basic engine operating parameter including an engine revolution speed and an engine load, and said sixth means derives a first correction value component on the basis said concentration of the selected one of fuels and said engine revolution speed and a second correction value component on the basis of said concentration of the selected one of the fuels and said engine load.

14. A spark ignition timing control system as set forth in claim 13, wherein second correction value is derived by summing said first and second correction value components.

* * * * *